United States Patent
Agostinelli et al.

(10) Patent No.: US 7,909,474 B2
(45) Date of Patent: Mar. 22, 2011

(54) DISPLAY APPARATUS USING BILINEAR ELECTROMECHANICAL MODULATOR

(75) Inventors: John A. Agostinelli, Rochester, NY (US); Marek W. Kowarz, Henrietta, NY (US); Michael A. Marcus, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 629 days.

(21) Appl. No.: 11/950,488

(22) Filed: Dec. 5, 2007

(65) Prior Publication Data
US 2009/0147220 A1     Jun. 11, 2009

(51) Int. Cl.
G03B 21/26 (2006.01)
(52) U.S. Cl. .......................... 353/94; 353/122
(58) Field of Classification Search .............. 353/94, 353/98, 99; 359/241, 242, 249, 250, 251, 359/259, 265, 266, 267, 268, 269, 270, 271, 359/272, 273, 274, 275
See application file for complete search history.

(56) References Cited

U.S. PATENT DOCUMENTS

| | | | |
|---|---|---|---|
| 6,215,579 B1 | 4/2001 | Bloom et al. | |
| 6,307,663 B1 | 10/2001 | Kowarz | |
| 6,411,425 B1 | 6/2002 | Kowarz et al. | |
| 6,552,855 B1 * | 4/2003 | Kowarz et al. | 359/627 |
| 6,567,217 B1 * | 5/2003 | Kowarz et al. | 359/618 |
| 6,663,788 B2 | 12/2003 | Kowarz et al. | |
| 6,802,613 B2 | 10/2004 | Agostinelli et al. | |
| 7,274,500 B2 | 9/2007 | Kowarz | |
| 2004/0075817 A1 * | 4/2004 | Agostinelli et al. | 353/34 |
| 2006/0152436 A1 * | 7/2006 | Kowarz | 345/30 |
| 2007/0047061 A1 | 3/2007 | Kowarz | |

FOREIGN PATENT DOCUMENTS

GB  2 295 743 A   6/1996
WO  WO 2007/081215 A1   7/2007

OTHER PUBLICATIONS

J. Agostinelli et al.: "GEMS: A Simple Light Modulator for High-Performance Laser Projection Display", Proceedings of the 13th International Display Workshops (IDW 06), Dec. 7, 2006, pp. 1579-1582, XP-002538522.

* cited by examiner

*Primary Examiner* — Georgia Y Epps
*Assistant Examiner* — Bao-Luan Le
(74) *Attorney, Agent, or Firm* — Nelson Adrian Blish

(57) ABSTRACT

A digital projection apparatus has a first light modulation subsystem with a first light source producing linear illumination of a first spectral color and a second light source producing linear illumination of a second spectral color. A first light modulator chip (110*a*) has at least two independently addressable linear arrays of light modulating devices. A first spatial filter (108) blocks reflected light and transmits diffracted light along a first optical path. A second light modulation subsystem has at least a third light source producing linear illumination of a third spectral color. A second light modulator chip has at least one independently addressable linear array of light modulating devices. A second spatial filter blocks reflected light and transmits diffracted light along a second optical path. A color combining element directs modulated light onto a common optical path. Projection optics direct modulated light toward a scanning element (122) for projection toward a display surface (124).

8 Claims, 8 Drawing Sheets

DISPLAY APPARATUS USING BILINEAR ELECTROMECHANICAL MODULATOR

FIELD OF THE INVENTION

This invention generally relates to display apparatus and more particularly relates to a display apparatus using an arrangement of bilinear electromechanical grating devices.

BACKGROUND OF THE INVENTION

With continuing improvements in cost and performance, solid-state lasers have potential benefits as illumination components for display systems. Their inherent spectral purity, high brightness, and long operating life have sparked particular interest among designers of high-end color projection systems. However, proposed solutions for using laser light sources for digital projection fall short of what is needed for providing robust display apparatus that take advantage of this potential.

Various solutions that have been proposed include using laser light illumination with spatial light modulators that employ electromechanical devices. Among solutions most familiar to those skilled in the imaging arts are designs using micromirror devices, such as those using digital light projector (DLP) technology promoted by Texas Instruments, Inc. of Dallas, Tex. Another set of solutions have been proposed using grating light valve (GLV) designs, offered by Silicon Light Machines as described by in U.S. Pat. No. 6,215,579 (Bloom et al.), and others. Still other solutions have been proposed using grating electro-mechanical systems (GEMS) devices, such as those disclosed in commonly-assigned U.S. Pat. No. 6,802,613 (Agostinelli et al.) which addresses the need to represent a larger fraction of the visible color space, in electronic projection systems, by incorporating more than three primary colors of light.

Although these proposed solutions have merit, there are practical problems that have yet to be adequately addressed. DLP and other digital micromirror devices are challenged by limitations in resolution, bit-depth, yield, and scalability for large-format projection. GLV device architecture, requires a complex design of supporting components. GEMS devices, advantaged for simplicity of fabrication and capable of more compact packaging, can still require relatively complex and costly optical designs, particularly where more than three color sources are used.

One notable difficulty faced by color electronic display apparatus designers relates to the need for precise optical alignment of the individual color paths in multi-chip systems. When using multiple spatial light modulators, each spatial light modulator must be precisely in register with each other spatial light modulator. This creates difficulties for designs having more than three primary colors of light.

One workaround to this problem uses "color sequential" solutions that employ a single modulator chip and direct each primary color (typically red, green, and blue, represented as RGB) to the modulator in sequence. With such a color sequential solution, a single modulator chip is fixed in place so that each primary of the modulated light is automatically registered with respect to the other primaries. However, this advantage comes at the price of lost light, since on average only one-third of the available light from each light source can be used for a three-primary color system. Systems using four or more colors would be even more severely hampered by lost brightness.

Where it is desirable to have three or more colors, none of the existing approaches is optimal. Using three or more GEMS devices is feasible, but this type of solution makes for a more complex optical system and more difficult alignment of optical path components. Using a single chip GEMS device bypasses this alignment problem, but this solution compromises light output. As a result, even though lower cost laser light sources with increased brightness are being introduced, existing approaches to laser projection design limit the potential gains in brightness and overall efficiency.

Thus far, in spite of considerable effort and innovation, design solutions that allow use of three or more laser colors, with high efficiency, compact optics, and reduced cost have proved elusive. With the advent of high-performance and low-cost laser sources in the red, green, and blue spectra and the promise of improved color gamut in using these light sources, there is a recognized need for projection apparatus using electromechanical devices that provide high-performance, low cost laser projection display.

SUMMARY OF THE INVENTION

It is an object of the present invention to address the need for improved projection apparatus. With this object in mind, the present invention provides a digital projection apparatus comprising:
 a) a first light modulation subsystem comprising:
  a first light source configured to produce linear illumination of a first spectral color;
  a second light source configured to produce linear illumination of a second spectral color;
  a first light modulator chip having at least two independently addressable linear arrays of light modulating devices;
  a first spatial filter disposed to block reflected light from the at least two arrays of light modulating devices and to transmit diffracted light from the at least two arrays of light modulating devices along a first optical path;
 b) a second light modulation subsystem comprising:
  at least a third light source configured to produce linear illumination of a third spectral color;
  a second light modulator chip having at least one independently addressable linear array of light modulating devices;
  a second spatial filter disposed to block reflected light from the at least one array of light modulating devices and to transmit diffracted light from the at least one array of light modulating devices along a second optical path;
 c) a color combining element disposed near the intersection of the first and second optical paths to direct incident modulated light from the first and second optical paths onto a common optical path; and
 d) projection optics disposed to direct modulated light along the common optical path toward a scanning element for projection toward a display surface.

It is a feature of the present invention that it provides apparatus using bilinear GEMS spatial light modulators for improved brightness and light utilization.

It is an advantage of the present invention that it provides projection apparatus designs using three or more lasers with reduced complexity and reduced optical alignment requirements over conventional designs.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figures shown and described herein are provided in order to illustrate key principles of operation of the present invention and are not drawn with intent to show actual size or scale. Some exaggeration may be necessary in order to emphasize relative spatial relationships or principles of operation.

Embodiments of the present invention use grating electromechanical systems (GEMS) devices to provide display apparatus that allow advantages such as improved use of laser light sources and increased brightness, using less complex optical designs than had been previously proposed. In the context of the present disclosure, the term "chip" is used as it is familiarly used by those skilled in the micro-electromechanical device arts. The term chip refers to the one-piece electromechanical circuit package that includes one or more linear arrays of conformal grating devices, such as those described in detail in commonly-assigned U.S. Pat. No. 6,411,425 (Kowarz et al.). The chip not only includes the elongated ribbon elements that form the light-modulating grating for light reflection and diffraction, but also includes the underlying circuitry that applies the electrostatic force that is used to actuate these ribbon elements. In manufacture, the tiny electronic and mechanical components that form the chip, such as the GEMS chip shown in the Kowarz et al. '425 patent, are fabricated onto a single substrate. The chip package also includes signal leads for interconnection and mounting onto a circuit board or other suitable surface.

Further detailed description of GEMS device architecture and operation is given in a number of commonly-assigned U.S. patents and published applications, including U.S. Pat. No. 6,307,663 (Kowarz); U.S. Pat. No. 6,663,788 (Kowarz et al.); and U.S. Pat. No. 6,802,613 (Agostinelli et al.). In GEMS devices, light is modulated by diffraction. On a GEMS chip, the linear array of conformal electromechanical ribbon elements, formed on a single substrate, provides one or more diffracted orders of light to form each line of pixels for line-scanned projection display.

Figure 1:
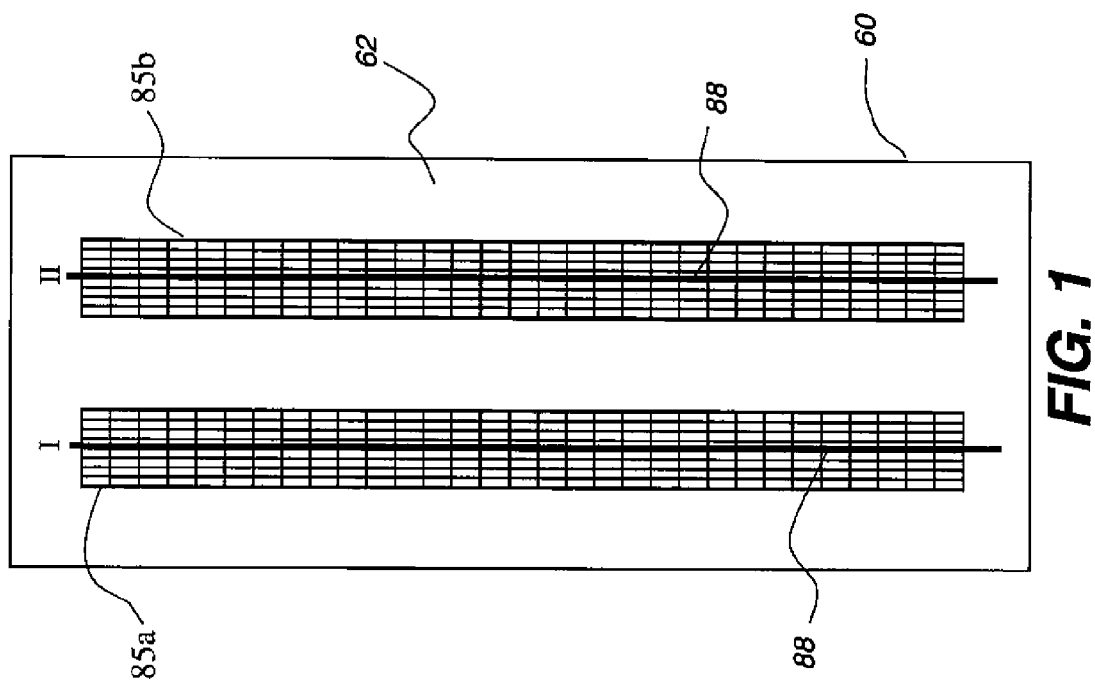
FIG. 1 is a plan view of a bilinear GEMS chip.

Bilinear GEMS devices, as described in commonly-assigned U.S. Patent Application Publication No. 2007/0047061 (Kowarz), provide two separate electromechanical grating light modulator array sections, that is, two linear arrays of conformal electromechanical grating devices formed on a single substrate. FIG. 1 shows a bilinear GEMS chip 60 formed on a substrate 62 with two separate electromechanical grating light modulator array sections labeled 85a (I) and 85b (II). For reference, the relative position of incident linear illumination 88 is shown as it would be directed to each section. In this type of device, each of the two linear arrays of light modulating devices 85a and 85b that form sections I and II can be separately modulated. Typically, each of the light modulating devices on the linear arrays would have its own associated electronic driver channel.

Figure 2A:
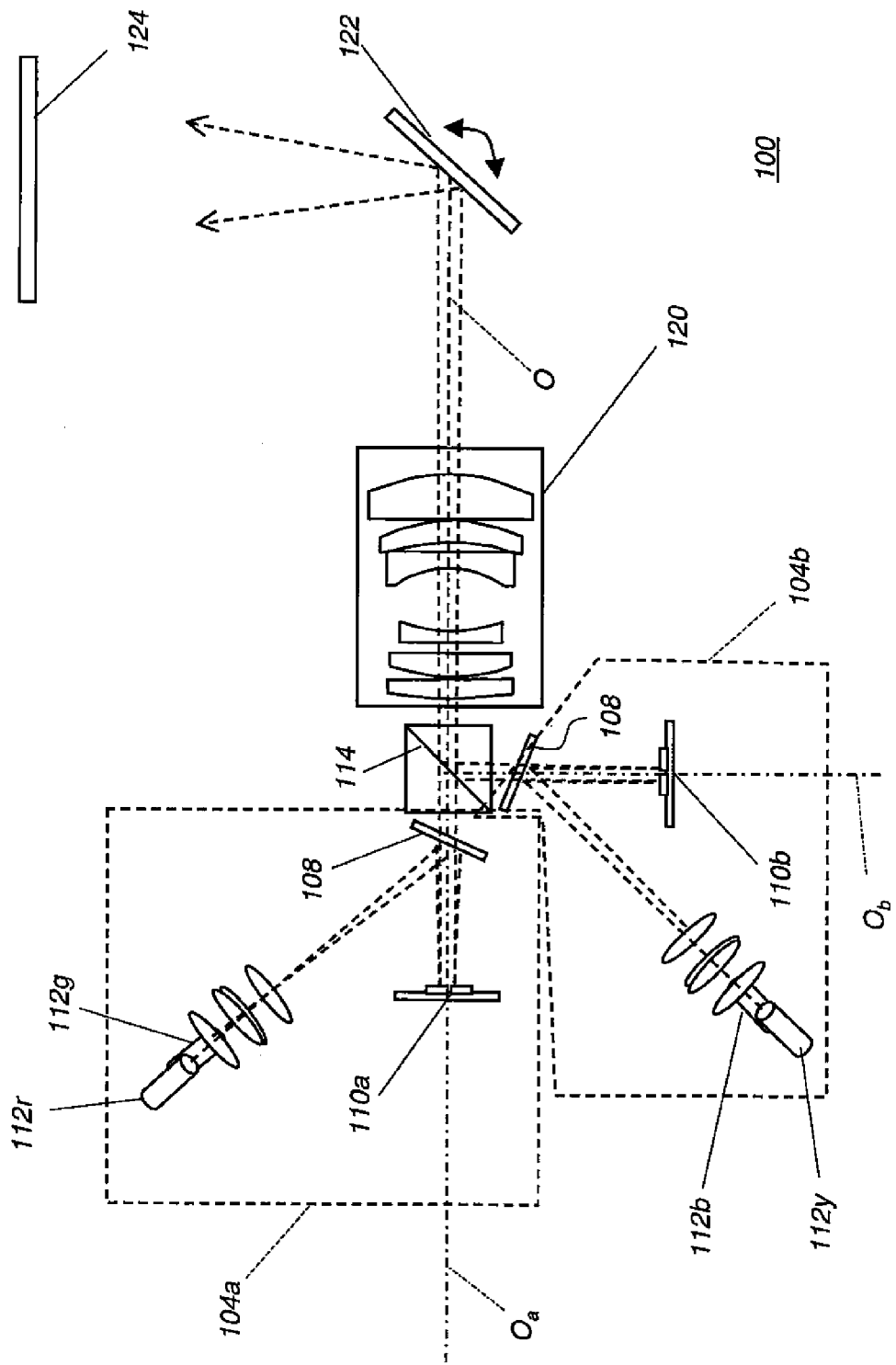
FIG. 2A is a schematic block diagram showing a four-color display apparatus in one embodiment of the present invention.

Referring to FIG. 2A, there is shown an embodiment of a display apparatus 100 having two light modulation subsystems, shown as light modulation modules 104a and 104b that provide four-color output. Modulation modules 104a and 104b use bilinear GEMS spatial light modulator chips 110a and 110b, respectively. Each bilinear GEMS spatial light modulator chip modulates light from two laser light sources. Light from the first of the two laser light sources forms the linear illumination 88 incident on linear array 85a and light from the second of the two laser light sources forms the linear illumination 88 incident on linear array 85b. In the example shown, bilinear GEMS spatial light modulator chip 110a modulates incident linear illumination from a red laser 112r and a green laser 112g. Bilinear GEMS spatial light modulator chip 110b modulates incident linear illumination from a blue laser 112b and a cyan laser 112y. Each light modulation module 104a and 104b also has a spatial filter 108 that blocks reflected light from the pair of arrays of light modulating devices and transmits diffracted light from the pair of arrays of light modulating devices along an optical path $O_a$ or $O_b$, respectively. Spatial filter 108 could be, for example, a patterned turning mirror that has alternating reflective and transmissive sections and is disposed to direct illumination from the laser sources to bilinear GEMS spatial light modulator chip 110a or 110b respectively, and to transmit modulated light from the light modulator chips. A dichroic beamsplitter or other color combining element 114 is disposed near the intersection of the first and second optical paths $O_a$ and $O_b$ and treated to direct incident modulated light from the first and second optical paths $O_a$ and $O_b$ onto a common optical path O. Projection optics 120 then directs the modulated light along optical path O toward scanning element 122, such as a scanning mirror which, in turn, directs the modulated light toward a display surface 124.

Figure 2B:
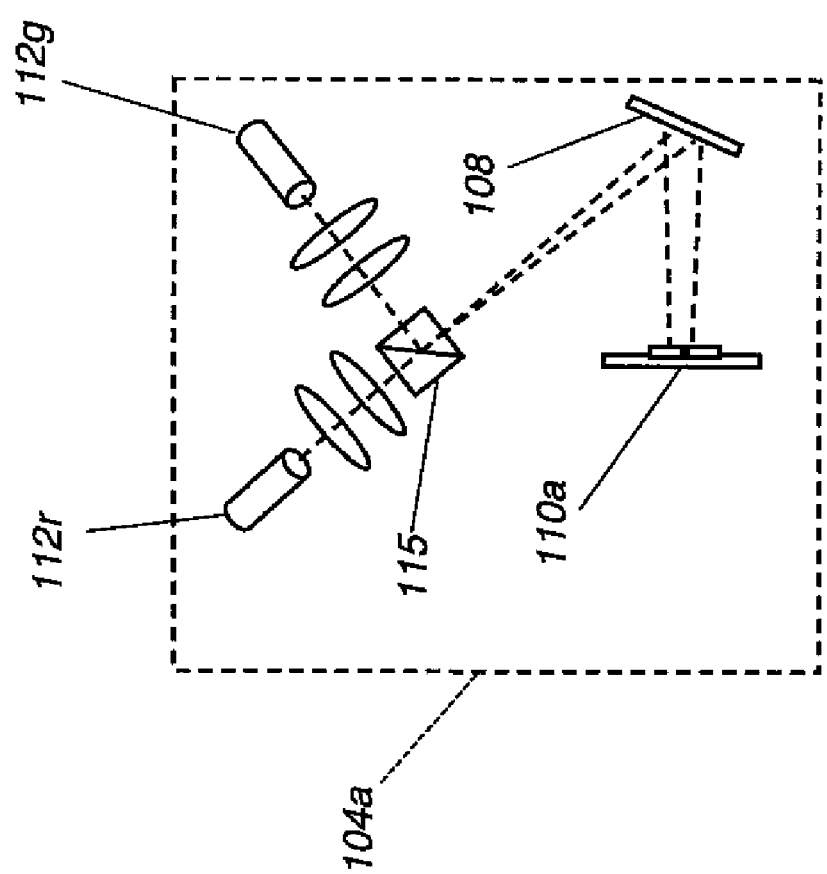
FIG. 2B shows an alternate embodiment of the light modulation module.

In FIG. 2A, two lasers within a single light modulation module are angularly directed to illuminate a bilinear GEMS spatial light modulation chip. Alternatively, as shown in FIG. 2B, light from two lasers having different colors can be combined onto the same illumination path using a dichroic color combining element 115. This approach may be used in any or all of the light modulation modules.

The embodiment of FIG. 2A provides four-color operation without the drawbacks of earlier approaches, such as those described earlier in the background section. Three advantages are of particular interest in contrast to earlier designs. First, four colors can be provided using only two GEMS modulator chips, reducing the cost and complexity and alignment complications of system designs requiring three or more GEMS modulator chips. This provides full-color operation and provides the advantage of a fourth color for expanded color gamut. Second, the need for color-sequential operation, with its concomitant reduction in brightness, is eliminated. Instead, with the embodiment of FIG. 2A, all four lasers 112r, 112g, 112b, and 112y can emit light in a substantially continuous fashion, as is described subsequently. Multiplexing arrangements that share the same light modulation resources are not used. For a given screen image brightness, this configuration allows the use of laser sources having one fourth the peak power of color-sequential designs. Third, the design of FIG. 2A can make use of simple dichroic beamsplitters for color combination. Typically, designs with three or more light modulator chips use X-cubes, Philips prisms or other complex and expensive prism arrangements in order to combine color paths.

The basic pattern shown in FIG. 2A admits a number of embodiments and modifications, using three or more colors, all within the scope of the present invention. In the embodiment shown in FIG. 3, display apparatus 100 again has two light modulation subsystems, modules 104a and 104b, but only light modulation module 104b uses a bilinear GEMS spatial light modulator chip 110. Light modulation module 104a uses a linear GEMS spatial light modulator chip 116 to modulate a single laser light source, here green laser 112g. This arrangement offers similar advantages as noted for the FIG. 2A embodiment: (i) simplified alignment over conventional arrangements using three GEMS modulator chips to provide three colors; and (ii) brightness and utilization advantages over color-sequential designs.

Adjusted Resolution Embodiments

It is known to those skilled in the electronic color projection arts that the green color channel is of particular importance for luminance, and therefore perceived image resolution, and that red and blue color channels are of less significance for this purpose. Further embodiments of the present invention take advantage of this behavior by providing modulation of different color channels at different resolutions. Thus, for example, using the embodiment of FIG. 3, the green color channel of light modulation module 104a would be at full resolution. Red and blue color channels provided by light modulation module 104b would each be at half the resolution of the green color channel along the array axis and, optionally, also along the scan axis.

Figure 4:
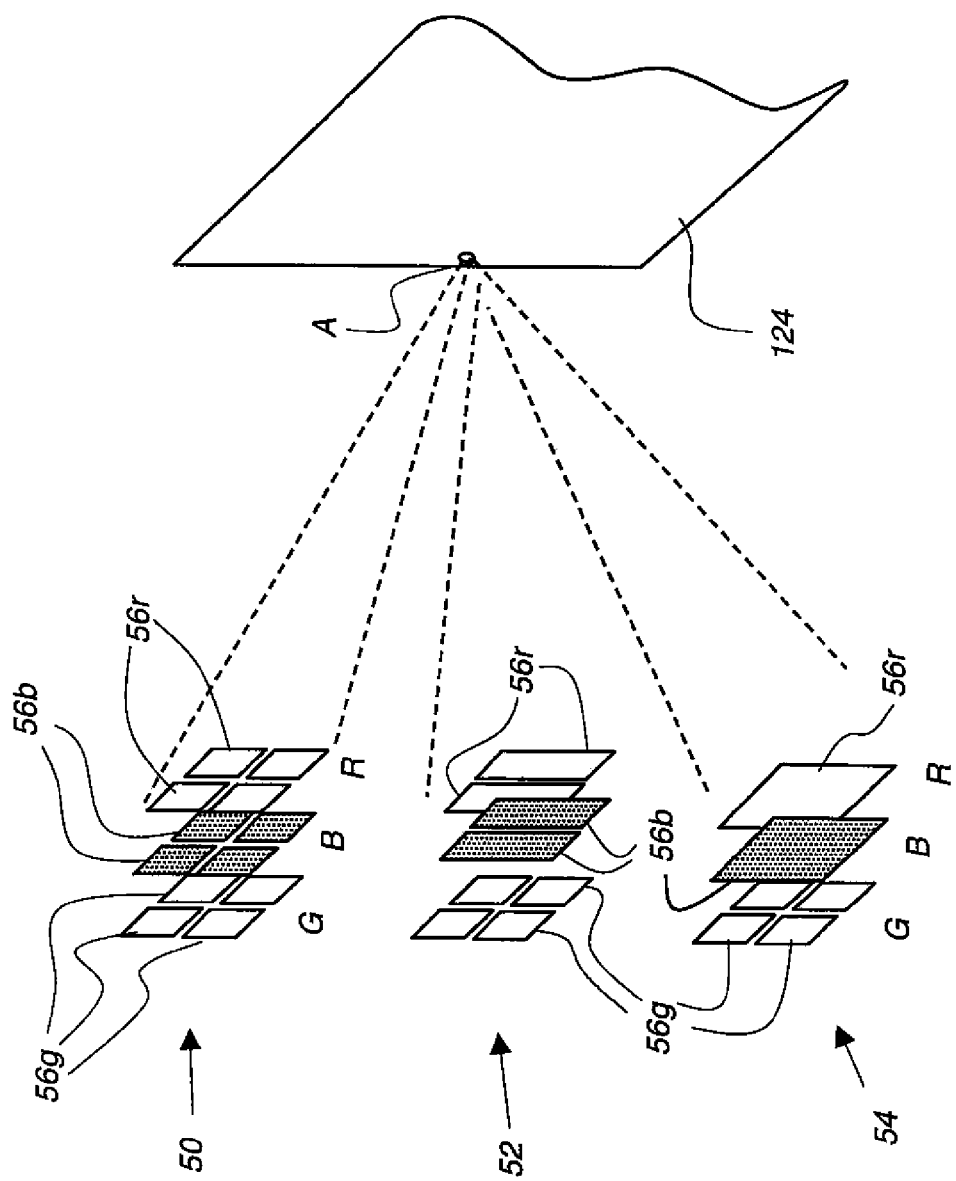
FIG. 4 is a perspective view showing different pixel resolution arrangements.

FIG. 4 shows, from a perspective view, some of the possible full-resolution and reduced-resolution arrangements that could be used, labeled as pixel arrangements 50, 52, and 54. Pixels of different colors, here shown as red (R) pixel 56r, green (G) pixel 56g, and blue (B) pixel 56b are shown magnified at different resolutions, as they could be projected, in overlaid manner, onto an area A on display surface 124. As this figure shows, pixels 56r, 56g, and 56b can be any of three sizes. In pixel arrangement 50, representing the highest resolution for each GEMS modulator array 85a or 85b, each pixel 56r, 56g, and 56b for the primary colors is the same size. In pixel arrangement 52, only the green color plane formed from pixels 56g has full resolution; red and blue pixels 56r and 56b are half of the green resolution (alternately, twice the pixel size) in one dimension. Half resolution can be obtained in the scan direction by adjustment to data timing, and in the linear array direction by operating GEMS modulator array 85a or 85b at reduced resolution. In pixel arrangement 54, red and blue pixels 56r and 56b have half of the green pixel 56g resolution in both directions. This same reduced resolution arrangement can be extended to one, two, or three colors in a four-color embodiment, such as that shown in FIG. 2A.

Reduced resolution arrangements are advantaged in a number of ways. Response timing requirements for bilinear GEMS spatial light modulator chip 110 are relaxed. In addition, fabrication requirements can be reduced, allowing additional space for routing of control signal traces on the bilinear GEMS substrate, which can be constrained with full-resolution bilinear designs.

Line Scan Considerations

Figure 5:
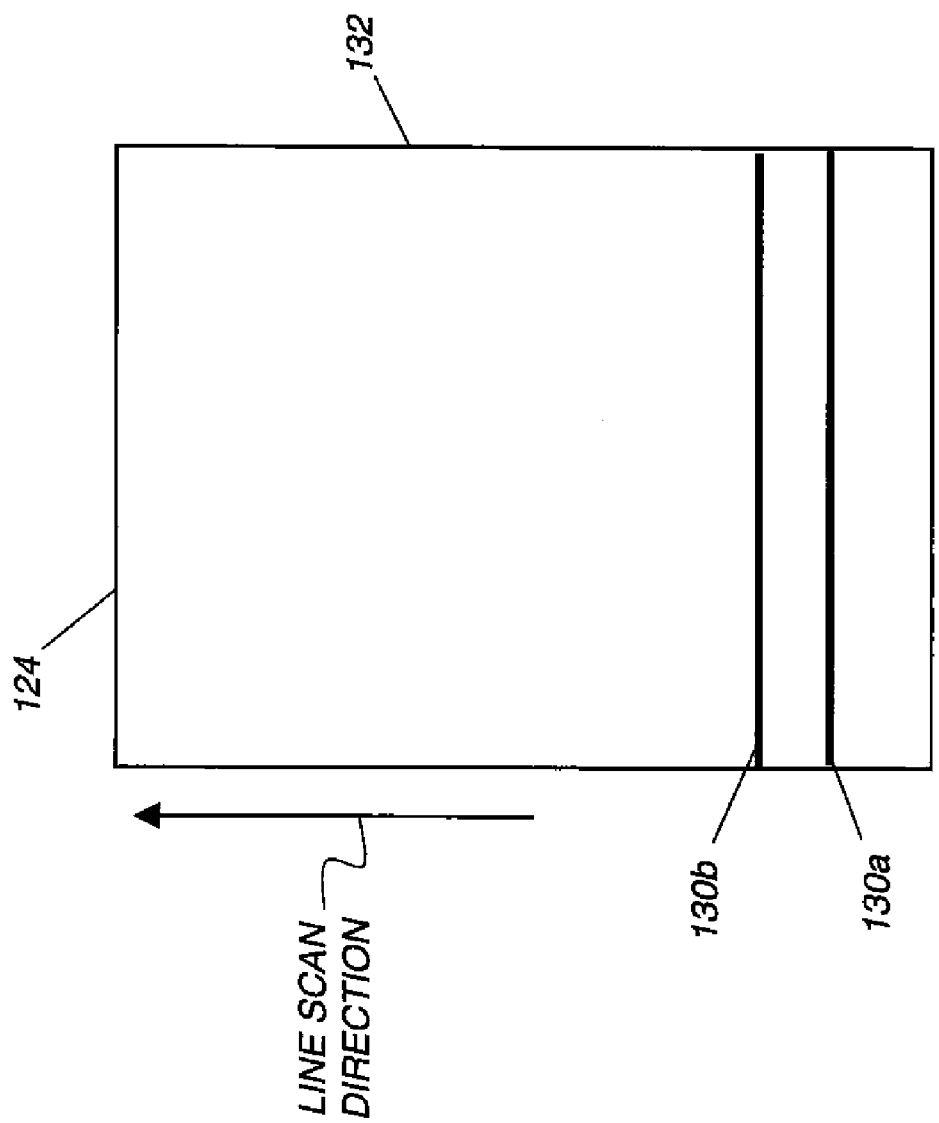
FIG. 5 is a plan view showing line scan formation of a two-dimensional image.

Referring to FIG. 5, there is shown, in exaggerated manner, a configuration of line scans provided at a single instant from scanning element 122. Details of the scan and column-timing operation for multi-linear arrays are disclosed in previously cited U.S. Patent Application Publication No. 2007/0047061, for example. Briefly, with reference back to FIGS. 2 and 3, the line scans projected toward display surface 124 from scanning element 122 form instantaneous line images, shown as line images 130a and 130b in FIG. 5. In this example, line image 130a is generated from one of the linear arrays 85a of bilinear GEMS spatial light modulator chip 110b of light modulation module 104b; line image 130b is generated from the other of the linear arrays 85b of bilinear GEMS spatial light modulator chip 110b of light modulation module 104b. Instantaneous line images corresponding to the one or two linear arrays of bilinear GEMS spatial light modulator chip 110a of light modulation module 104a would also appear overlaid with those shown on display surface 124. Preferably, in order to simplify timing considerations, the images of the one or two linear arrays of the GEMS modulator chip (110a or 116) in light modulation module 104a are made to overlay line images 130a and 130b, so that there would be only two line images instantaneously present, rather than three or four. At a following instant, other line images are generated and projected, incrementally displaced from these line images in the line scan direction. Continuing in this pattern, numerous line images are scanned onto display surface 124 in order to form a two-dimensional image 132 for display.

It can be readily recognized that the pattern for scanned line image display just described with reference to FIG. 5 admits of a number of variations, particularly for embodiments that employ bilinear GEMS spatial light modulator chips 110.

Color Gamut Considerations

Figure 6:
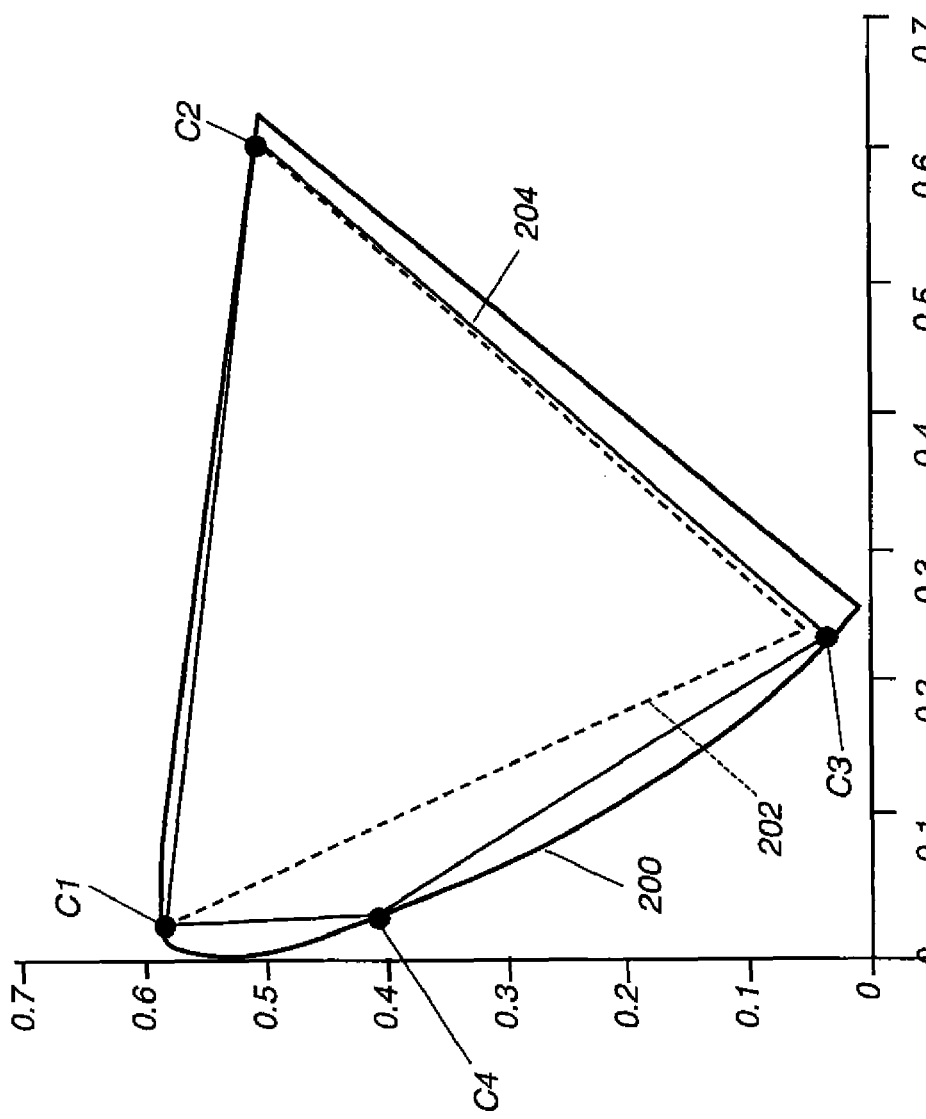
FIG. 6 is a graph showing color space mapping for three- and four-color embodiments.

There is considerable interest in increasing the range or gamut of colors that can be displayed in order to provide a more realistic, more vivid image than is possible with the gamut limitations of film dyes or phosphors. The familiar tristimulus CIE color model developed by Commission International de l'Eclairage (International Commission on Illumination) shows the color space perceived by a standard human observer. FIG. 6 shows the CIE color model in the u', v' space, which represents a visible gamut 200 as a familiar "horseshoe" curve. Within visible gamut 200, the gamut of a conventional display device can be represented by a three-sided device gamut 202, such as standard Society of Motion Picture and Television Engineers (SMPTE) phosphors, for example. As is well known in the color projection arts, it is desirable for a display device to provide as much of visible gamut 200 as possible in order to faithfully represent the actual color of an image or to provide a wide range of colors for graphics or computer-generated imagery, for example.

Referring to FIG. 6, pure, saturated spectral colors are mapped to the "horseshoe" shaped periphery of visible gamut 200. The component colors of a display, typically primary colors red, green, and blue (RGB), define the vertices of the polygon for a color gamut, thereby defining the shape and limits of device gamut 202, shown in dashed line for better visibility. Ideally, these component colors are as close to the periphery of visible gamut 200 as possible. The interior of the "horseshoe" then contains all mappings of mixtures of colors, including mixtures of pure colors with white, such as spectral red with added white, which becomes pink, for example.

One simple strategy to increase the size of device gamut 202 is to use light sources that are spectrally pure, or have at least a good degree of spectral purity. Lasers, due to their inherent spectral purity, are particularly advantaged for maximizing device gamut 202. A second strategy for expanding color gamut is to move from the conventional triangular area of device gamut 202, as shown in FIG. 6, to a polygonal area, shown as an expanded device gamut 204. In order to do this, one or more additional primary spectral colors must be added. Primary spectral colors C1, C2, C3, and C4 are represented as dots that form the vertices of expanded device gamut 204.

Referring back to FIGS. 2 and 3, dichroic beamsplitter 114, shown here as one exemplary type of color combiner, allows combination of the three or more spectral colors used in display apparatus 100. Spectral behavior and coating properties for these surfaces are well known to those skilled in the dichroic coatings art.

Figure 3:
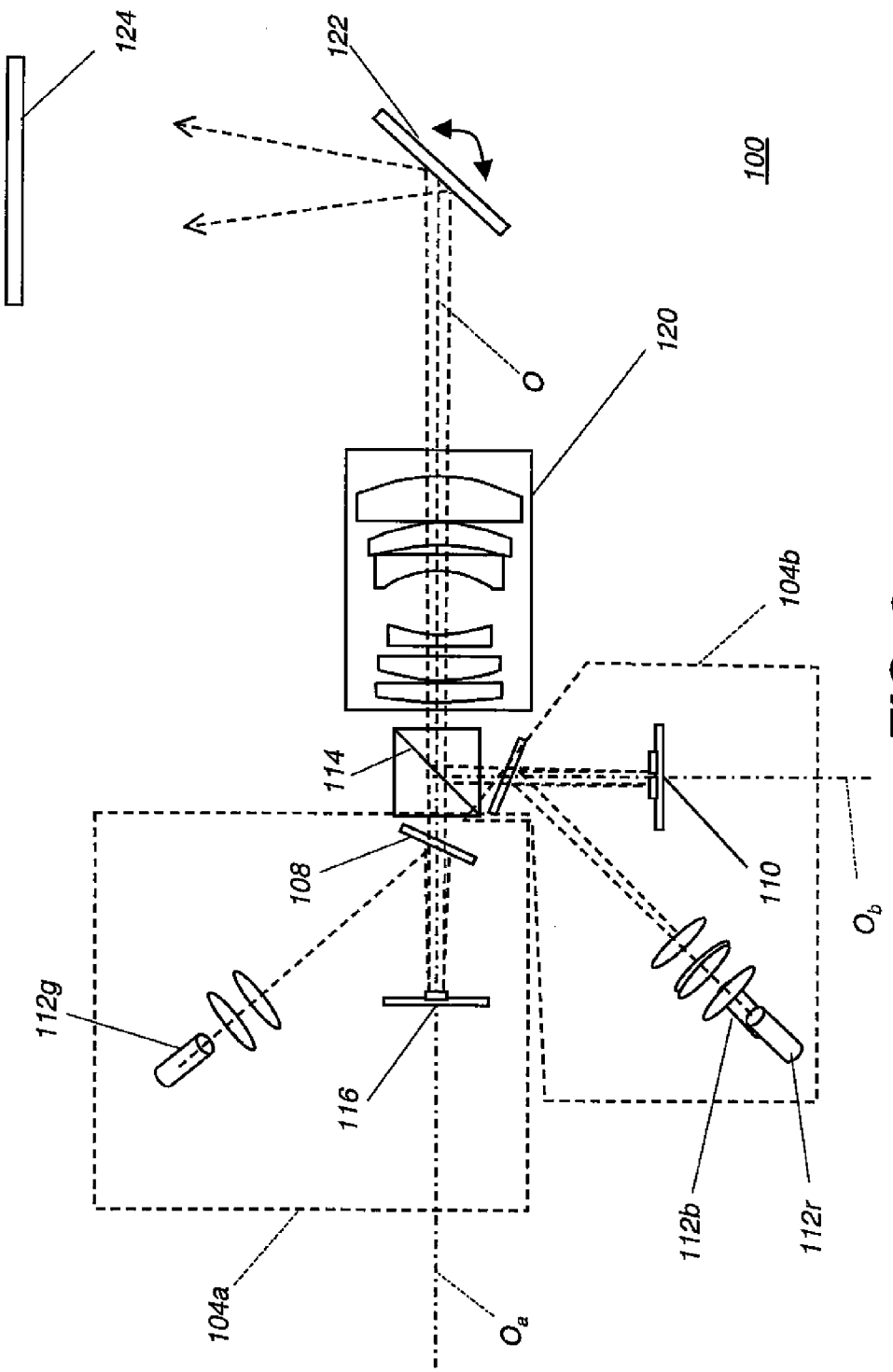
FIG. 3 is a schematic block diagram showing a three-color display apparatus in one embodiment of the present invention.

Lasers 112r, 112g, 112b, and 112y are shown as the light sources for display apparatus 100 in embodiments of FIGS. 2 and 3. Lasers are advantaged because of their relative spectral purity and spatial coherence. However, other types of light sources could be used for providing linear illumination to the GEMS spatial light modulator chip.

Figure 7:
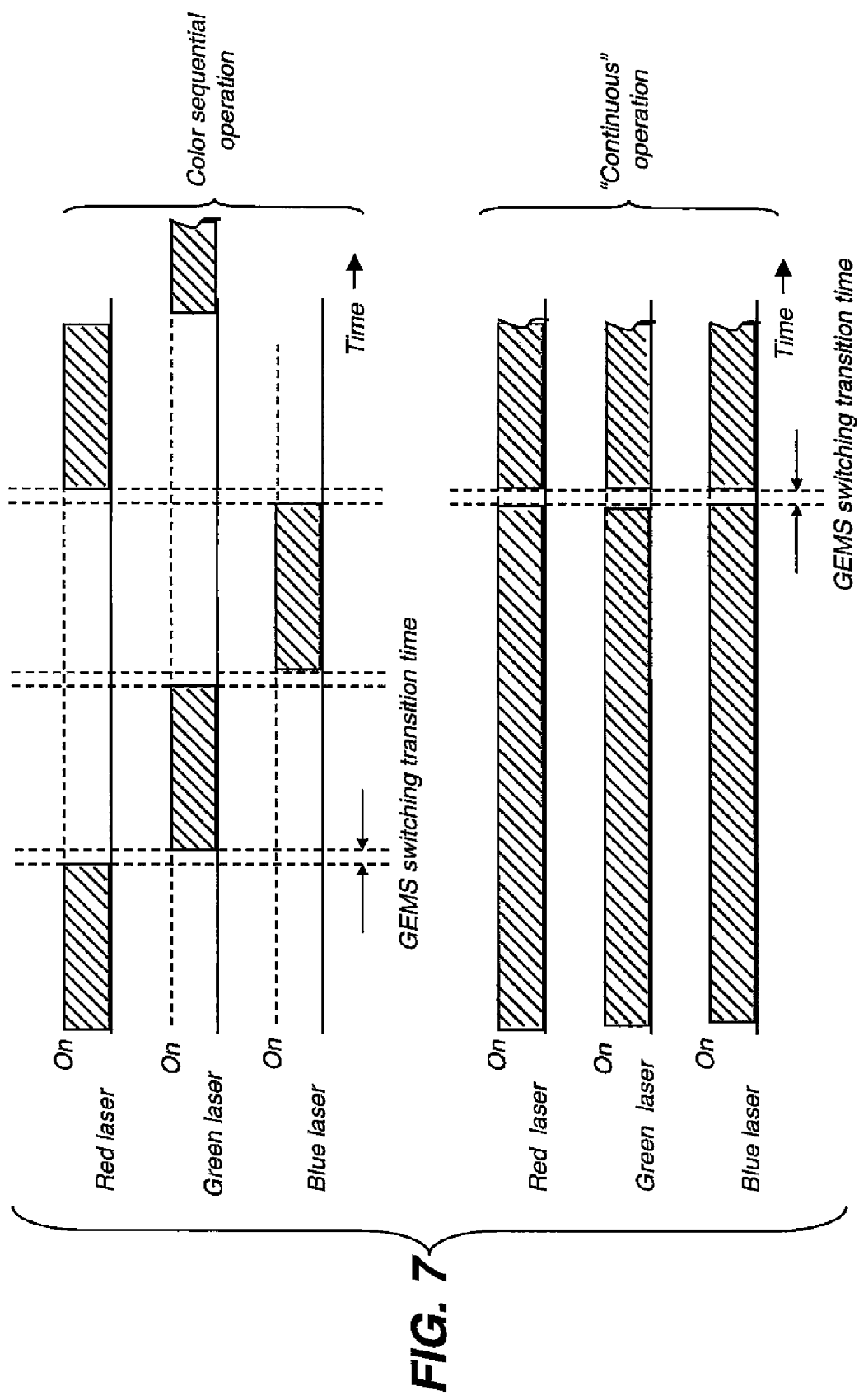
FIG. 7 is a timing chart comparing color sequential operation with "continuous" operation that can be used by embodiments of the present invention.

One advantage of the bilinear GEMS chip in display apparatus 100 of the present invention relates to light utilization. As noted earlier in the background section, one method for providing color projection uses color sequential timing. The timing charts of FIG. 7 compare color sequential timing for three color operation with the "continuous" operation afforded by embodiments of the present invention. The hatched area of each timing sequence in FIG. 7 indicates the light that is actually projected with each sequence.

Lasers can be continuously energized both during color sequential operation and during the continuous operation that is allowed using embodiments of the present invention. However, as FIG. 7 shows, color sequential operation uses only one-third of the available light; the other two-thirds of the light would be effectively wasted with lasers left on using color sequential timing. Typically, with color sequential timing, the separate color lasers are cycled on and off as the light is needed, in synchronization with the modulation sequence. On the other hand, continuous operation, available using the embodiments described with reference to FIGS. 2 and 3, uses most of the available light.

Conventionally, sequential color operation has been used because of the high cost of 2D spatial light modulators, especially at higher resolution. The use of bilinear GEMS spatial light modulator chips, however, changes this cost/performance trade-off and allows a substantial increase in available light output. Continuous utilization of laser light allows use of lower power lasers for a given screen luminance, when compared to sequential-color architectures.

It can be appreciated that a number of additional configurations using two GEMS spatial light modulator chips are within the scope of the present invention. Alternate embodiments include use of one or more trilinear GEMS spatial light modulator chips, as described in commonly assigned U.S. Pat. No. 7,274,500 (Kowarz). With slight addition to modify the arrangement shown in FIG. 2A, for example, light modulation module 104b could utilize a trilinear GEMS spatial light modulator chip to modulate three colors. Combining this with a bilinear GEMS spatial light modulator chip in light modulation module 104a would provide display apparatus 100 with five-colors, with additional enhancement to the color gamut. Alternately, light modulation module 104a could also have a trilinear GEMS spatial light modulator chip, thereby providing a display apparatus 100 capable of providing six primary colors.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

Thus, what is provided is an apparatus and method for using bilinear electromechanical grating devices for three- and four-color projection.

PARTS LIST

| | |
|---|---|
| 60 | GEMS chip |
| 62 | substrate |
| 50 | pixel arrangement |
| 52 | pixel arrangement |
| 54 | pixel arrangement |
| 56r | red pixel |
| 56g | green pixel |
| 56b | blue pixel |
| 85a | array |
| 85b | array |
| 88 | linear illumination |
| 100 | display apparatus |
| 104a | light modulation module |
| 104b | light modulation module |
| 108 | spatial filter |
| 110 | bilinear GEMS spatial light modulator chip |
| 110a | bilinear GEMS spatial light modulator chip |
| 110b | bilinear GEMS spatial light modulator chip |
| 112r | red laser |
| 112g | green laser |
| 112b | blue laser |
| 112y | cyan laser |
| 114 | dichroic beamsplitter |
| 115 | dichroic color combining element |
| 116 | linear GEMS spatial light modulator chip |
| 120 | projection optics |
| 122 | scanning element |
| 124 | display surface |
| 130a | line image |
| 130b | line image |
| 132 | image |
| 200 | gamut |
| 202 | gamut |
| 204 | gamut |
| A | area |
| C1 | primary color |
| C2 | primary color |
| C3 | primary color |
| C4 | primary color |
| O | optical path |
| $O_a$ | first optical path |
| $O_b$ | second optical path |

The invention claimed is:

1. A digital projection apparatus comprising:
    a) a first light modulation subsystem comprising:
        a first light source configured to produce linear illumination of a first spectral color;
        a second light source configured to produce linear illumination of a second spectral color;
        a first light modulator chip having at least two independently addressable linear arrays of light modulating devices;

a first spatial filter disposed to block reflected light from the at least two arrays of light modulating devices and to transmit diffracted light from the at least two arrays of light modulating devices along a first optical path;
b) a second light modulation subsystem comprising:
at least a third light source configured to produce linear illumination of a third spectral color;
a second light modulator chip having at least one independently addressable linear array of light modulating devices;
a second spatial filter disposed to block reflected light from the at least one array of light modulating devices and to transmit diffracted light from the at least one array of light modulating devices along a second optical path;
c) a color combining element disposed near the intersection of the first and second optical paths to direct incident modulated light from the first and second optical paths onto a common optical path;
d) projection optics disposed to direct modulated light along the common optical path toward a scanning element for projection toward a display surface;
wherein one or more of the at least two independently addressable linear arrays of light modulating devices from the first chip modulates light at half the pixel resolution of modulated light in an array direction from the at least one independently addressable linear arrays of light modulating devices from the second chip;
wherein one or more of the at least two independently addressable linear arrays of light modulating devices from the first chip modulates light at half the pixel resolution of modulated light in a scan direction from the at least one independently addressable linear arrays of light modulating devices from the second chip; and
wherein half resolution is obtained in the scan direction by adjusting data timing and in the linear array direction by operating the modular array at half pixel resolution.

2. The digital projection apparatus of claim 1 wherein the first spatial filter comprises a first patterned turning mirror having alternating reflective and transmissive sections.

3. The digital projection apparatus of claim 1 wherein the second light modulation subsystem further comprises a fourth light source configured to produce linear illumination of a fourth spectral color and wherein the second light modulator chip further comprises a second independently addressable linear array of light modulating devices.

4. The digital projection apparatus of claim 1 wherein at least the first light source is a laser.

5. The digital projection apparatus of claim 1 wherein the color combining element is a dichroic beam splitter.

6. A digital projection apparatus comprising:
a) a first light modulation subsystem comprising:
a first laser configured to produce linear illumination of a first spectral color;
a second laser configured to produce linear illumination of a second spectral color;
a first light modulator chip having a first pair of independently addressable linear arrays of light modulating devices;
a first spatial filter disposed to block reflected light from the first pair of arrays of light modulating devices and to transmit diffracted light from the first pair of arrays of light modulating devices along a first optical path;
b) a second light modulation subsystem comprising:
a third laser configured to produce linear illumination of a third spectral color;
a fourth laser configured to produce linear illumination of a fourth spectral color;
a second light modulator chip having a second pair of independently addressable linear arrays of light modulating devices;
a second spatial filter disposed to block reflected light from the second pair of arrays of light modulating devices and to transmit diffracted light from the second pair of arrays of light modulating devices along a second optical path;
c) a color combining element disposed near the intersection of the first and second optical paths to direct incident modulated light from the first and second optical paths onto a common optical path;
d) projection optics disposed to direct modulated light along the common optical path toward a scanning element for projection toward a display surface;
wherein one or more of the at least two independently addressable linear arrays of light modulating devices from the first chip modulates light at half the pixel resolution of modulated light in an array direction from at least one of the two independently addressable linear arrays of light modulating devices from the second chip;
wherein one or more of the at least two independently addressable linear arrays of light modulating devices from the first chip modulates light at half the pixel resolution of modulated light in a scan direction from at least one of the two independently addressable linear arrays of light modulating devices from the second chip; and
wherein half resolution in the scan direction of one or more of the first and second spectral colors is obtained by adjusting data timing and in the linear array direction by operating the modular array at half pixel resolution.

7. A method for displaying a digital image comprising:
a) modulating linear illumination of a first spectral color on a first linear array of light modulating devices that is formed on a first substrate;
b) simultaneously modulating linear illumination of a second spectral color on a second linear array of light modulating devices that is formed on the first substrate;
c) simultaneously modulating linear illumination of a third spectral color on a third linear array of light modulating devices that is formed on a second substrate;
d) directing the modulated light from the first, second, and third linear arrays to a combining element that directs the modulated light onto a common optical path;
e) projecting the modulated light from the common optical path toward a display surface;
wherein modulating linear illumination of one or more of the first and second spectral colors is done at half the resolution in an array direction of modulating linear illumination of the third spectral color;
wherein modulating linear illumination of one or more of the first and second spectral colors is done at half the resolution in a scan direction of modulating linear illumination of the third spectral color; and
wherein half resolution in the scan direction of the one or more of the first and second spectral colors is obtained by adjusting data timing and in the linear array direction by operating the modular array at half pixel resolution.

8. The method of claim 7 further comprising simultaneously modulating linear illumination of a fourth spectral color on a fourth linear array of light modulating devices that is formed on the second substrate and directing the modulated light from the fourth linear array onto the color combining element that directs the modulated light onto the common optical path.

* * * * *